(12) United States Patent
Bianconi et al.

(10) Patent No.: US 8,240,572 B2
(45) Date of Patent: Aug. 14, 2012

(54) TERMINAL WITH RADIO TRANSCEIVER HAVING POWER OUTPUT

(75) Inventors: Thomas Bianconi, Aurora, NY (US); Bill Field, Weedsport, NY (US); Melissa Fiutak, Skaneateles, NY (US); Changnian Huang, Shanghai (CN); Joseph Livingston, Camillus, NY (US); Matthew W. Pankow, Camillus, NY (US); James B. Rosetti, Auburn, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 194 days.

(21) Appl. No.: 12/731,896

(22) Filed: Mar. 25, 2010

(65) Prior Publication Data

US 2011/0233280 A1   Sep. 29, 2011

(51) Int. Cl.
  *G06K 7/10*   (2006.01)
(52) U.S. Cl. .................... 235/462.46; 235/472.02
(58) Field of Classification Search ............ 235/462.46, 235/472.02, 375, 462.45, 472.01
See application file for complete search history.

(56) References Cited

U.S. PATENT DOCUMENTS

| | | | |
|---|---|---|---|
| 7,039,358 B1 * | 5/2006 | Shellhammer et al. ...... 455/41.2 | |
| 7,051,220 B2 | 5/2006 | Geiger et al. | |
| 7,266,289 B2 | 9/2007 | Kimura et al. | |
| 7,380,145 B2 | 5/2008 | Albulet | |
| 7,421,291 B2 | 9/2008 | Karaoguz et al. | |
| 7,450,577 B2 | 11/2008 | Johansson et al. | |
| 7,505,795 B1 | 3/2009 | Lim et al. | |
| 7,509,417 B1 | 3/2009 | Kammer et al. | |
| 7,555,663 B2 | 6/2009 | Krantz et al. | |
| 7,656,853 B2 | 2/2010 | Albulet | |
| 2002/0161658 A1 * | 10/2002 | Sussman ............ 705/26 |
| 2005/0066208 A1 | 3/2005 | Koie et al. | |
| 2008/0305839 A1 | 12/2008 | Karaoguz et al. | |

OTHER PUBLICATIONS

Specification of the Bluetooth System Covered Core Package Version 4.0; Bluetooth; Publication Dated Dec. 17, 2009 (1,630 pages).

* cited by examiner

*Primary Examiner* — Edwyn Labaze
(74) *Attorney, Agent, or Firm* — Heslin Rothenberg Farley & Mesiti PC

(57) ABSTRACT

There is provided for herein a terminal having a radio transceiver, the radio transceiver having a maximum output power and an operating power. The operating power is limitable to a power limit that less than or equal to the maximum output power and is operator selectable from a set of power limit values so as to reduce interference with other devices operating in the 2.4 GHz spectrum of the ISM band. In one embodiment, the set of power limit values includes the maximum output power and a plurality of additional values. In another embodiment, the set of power limit values includes a plurality of values, the plurality of values including at least first and second values less than 16 dB apart in magnitude.

25 Claims, 7 Drawing Sheets

TERMINAL WITH RADIO TRANSCEIVER HAVING POWER OUTPUT

FIELD OF THE INVENTION

This invention relates generally to the field of terminals, and more particularly to terminals having radio transceivers.

BACKGROUND OF THE INVENTION

A plethora of radio frequency (RF) emitters operate in an 83.5 MHz band between 2.4000 and 2.4835 GHz (the 2.4 GHz spectrum) within the globally available, license-free Industrial, Scientific, and Medical (ISM) band. These emitters include wireless; devices having Bluetooth radio transceivers, standardized wireless local area networking (WLAN) applications (e.g., IEEE 802.11), and random noise generators such as microwave ovens and sodium vapor street lamps. As a result, transmissions made by devices operating in the ISM band may be compromised by interference. To reduce such interference, devices having Bluetooth radio transceivers (Bluetooth devices), in particular may employ techniques such as adaptive frequency hopping (AFH), power control, and short data packets.

Bluetooth devices employing AFH "hop" among 79, or optionally fewer, 1 MHz spaced channels in the 83.5 MHz operating band in a pseudo-random fashion at a rate of 1,600 times per second. When another wireless device operating in one or more of these channels is introduced into the same environment as a Bluetooth device, interference among device transmissions may occur. AFH allows the Bluetooth device to adapt to this environment by identifying the channels in which there are sources of interference and excluding them from the list of available "hop" channels. Importantly, a Bluetooth device employs AFH only after it has established a connection with another Bluetooth device whereby packets of data can be sent back and forth between the two devices.

Power control, according to Bluetooth Specification v4.0, which is incorporated herein by reference, is a mandatory feature of all class 1 Bluetooth devices and an optional feature of class 2 and class 3 Bluetooth devices. The radio transceiver of a class 1 Bluetooth device has a maximum output power of 100 mW (20 dBm), the radio transceiver of a class 2 Bluetooth device has a maximum output power of 2.5 mW (4 dBm), and the radio transceiver of a class 3 Bluetooth device has a maximum output power of 1 mW (0 dBm). The power control feature may be used not only to optimize the battery power consumption of a Bluetooth device, but also to reduce the overall interference level among all devices operating in a shared environment and in the 2.4 GHz spectrum.

When a connection has been established between two Bluetooth devices, a receiving Bluetooth device incorporating the power control feature may request an increase or decrease of the operating power of a transmitting Bluetooth device's radio transceiver. The Bluetooth specification requires that increases and decreases in power be controlled in steps of 2 dB to 8 dB. By way of example, if the receiving device determines that reception from the transmitting device is lower than necessary to maintain a satisfactory link, the receiving device will send a request to the transmitting device to increase the power of its radio transceiver. If the radio transceiver of the transmitting device is already operating at its maximum output power, the transmitting device will refuse the request. Conversely, if the receiving device determines that reception from the transmitting device is higher than necessary to maintain a satisfactory link, the receiving device will send a request to the transmitting device to decrease the power of its radio transceiver. If the radio transceiver of the transmitting device is determines that a decrease in power would, for example, cause it to turn off, the transmitting device will refuse the request. However, by honoring the request, the transmitting device will send weaker transmissions that reduce interference.

Short Bluetooth data packets (8 octet minimum up to 27 octets maximum transferred at 1 Mbps) are employed to minimize interference among devices operating in the 2.4 GHz spectrum. If there are many devices in a shared environment operating in this spectrum, such as other Bluetooth or 802.11 radios, microwaves, or cordless phones, then packets may become corrupted while being transmitted over the air. When a receiving device does not acknowledge receiving corrupted packets from a transmitting device, the transmitting device must retransmit in-tact packets to the receiving device. Short data packets exchanged between two connected Bluetooth devices minimize the likelihood of packet corruption, thereby reducing the need for retransmissions. The resulting reduction in packet traffic, in turn, reduces interference.

Noticeably, the aforementioned techniques to reduce interference require an established connection between two Bluetooth devices. However, a Bluetooth device transmits packets that can cause interference even when it is not connected to another device. For example, a first, unconnected Bluetooth device desiring to find out what other Bluetooth-enabled devices are in the area transmits a series of inquiry packets. A second Bluetooth device in the area receiving such an inquiry may reply with Frequency Hop Synchronization (FHS) packets containing all of the information that the first device needs in order to connect to the second device.

In certain settings, terminals having radio transceivers are prevalent in both connected and unconnected states. For example, in a health care setting such as a hospital, bar code reading terminals having Bluetooth radio transceivers are used for purposes including administering proper drugs, treatments, and tests to proper patients at proper times, helping to eliminate counterfeit or expired drugs from being distributed, ensuring that blood of the proper blood type is used in a transfusion, identifying patients, identifying sterilized equipment, keeping track of locations of medical equipment such as heart-testing machines, joint replacements, and surgical staplers, controlling inventory, and monitoring devices used during surgery. Transmissions from these terminals, when connected or unconnected, can interfere with other hospital equipment such as terminal bases, respirators, external pacemakers, mechanical syringe pumps, and kidney dialysis machines, potentially causing such equipment to malfunction. Often times, the radio transceivers of connected or unconnected bar code reading terminals are functioning at an operating power equal to their maximum output power, sending strong transmissions contribute to interference with, for example, such hospital equipment.

SUMMARY OF THE INVENTION

There is provided a terminal having a radio transceiver, the radio transceiver having a maximum output power and an operating power. In one aspect, the terminal can be configured so that the operating power is limitable to a power limit that is less than or equal to the maximum output power so as to reduce interference with other devices operating in a shared environment and in the same spectrum, e.g., in the 2.4 GHz spectrum of the ISM band. In another aspect, the terminal can be configured so that the operating power is limited to less than or equal to the maximum output power in accordance with the power limit, regardless of whether the terminal is in a connected or unconnected state.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION OF THE INVENTION

Figure 1:
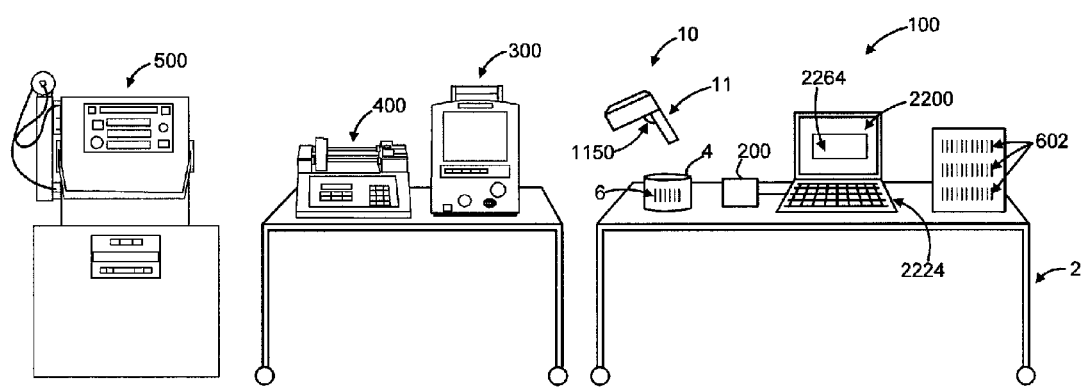
FIG. 1 is a diagram illustrating a system incorporating a terminal, a base, a host system, a respirator, a mechanical syringe pump, and a kidney dialysis machine.

Transmissions made by devices operating in a shared environment and in the same spectrum, e.g., in the 2.4 GHz spectrum of the ISM band, may be compromised by interference. This interference may be caused by devices in this environment that operate at unnecessarily high power and thereby send out strong transmissions. For example, in a health care setting such as that shown in FIG. 1, medical staff may wheel a cart 2 containing a terminal 10 and an associated base 200 connected to a host system 100 into a hospital room to, e.g., administer medication from a bottle 4 containing a bar code 6 to a patient wearing an identification bracelet having an identical bar code (not shown). Even if cart 2 is only temporarily located in the hospital room, interference may occur among terminal 10, base 200, a respirator 300, a mechanical syringe pump 400, and a kidney dialysis machine 500, especially if any of those devices are operating at maximum power, and regardless of whether there are established connections of communication between any of them. This interference can cause terminal 10, base 200, respirator 300, mechanical syringe pump 400, and/or kidney dialysis machine 500 to malfunction.

Figure 2:
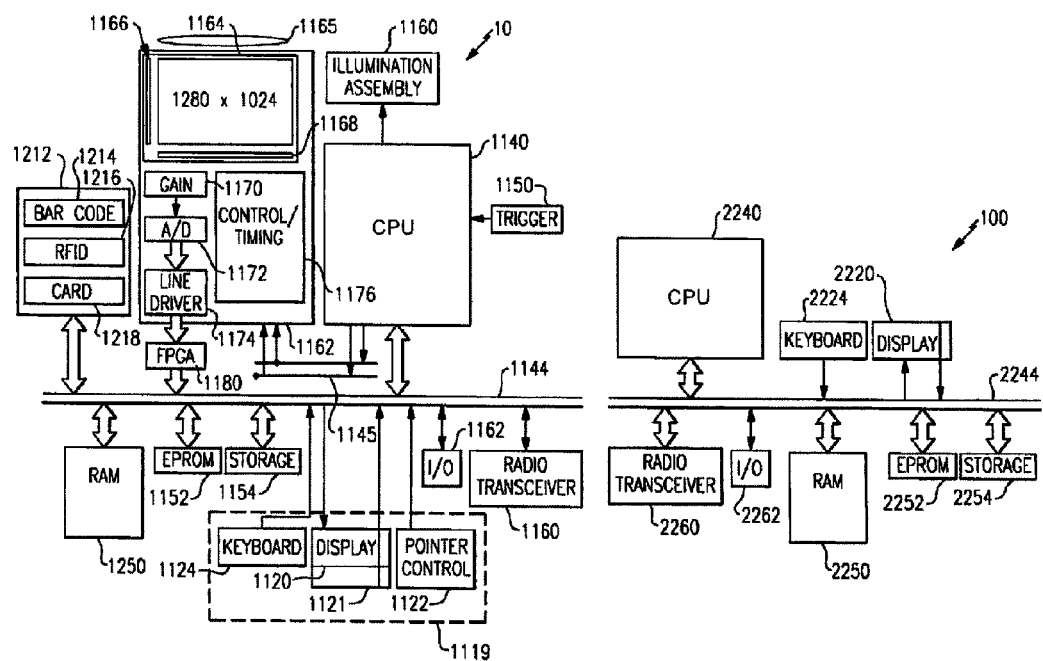
FIG. 2 is a block electrical diagram showing a terminal and a host system.
Figure 3:
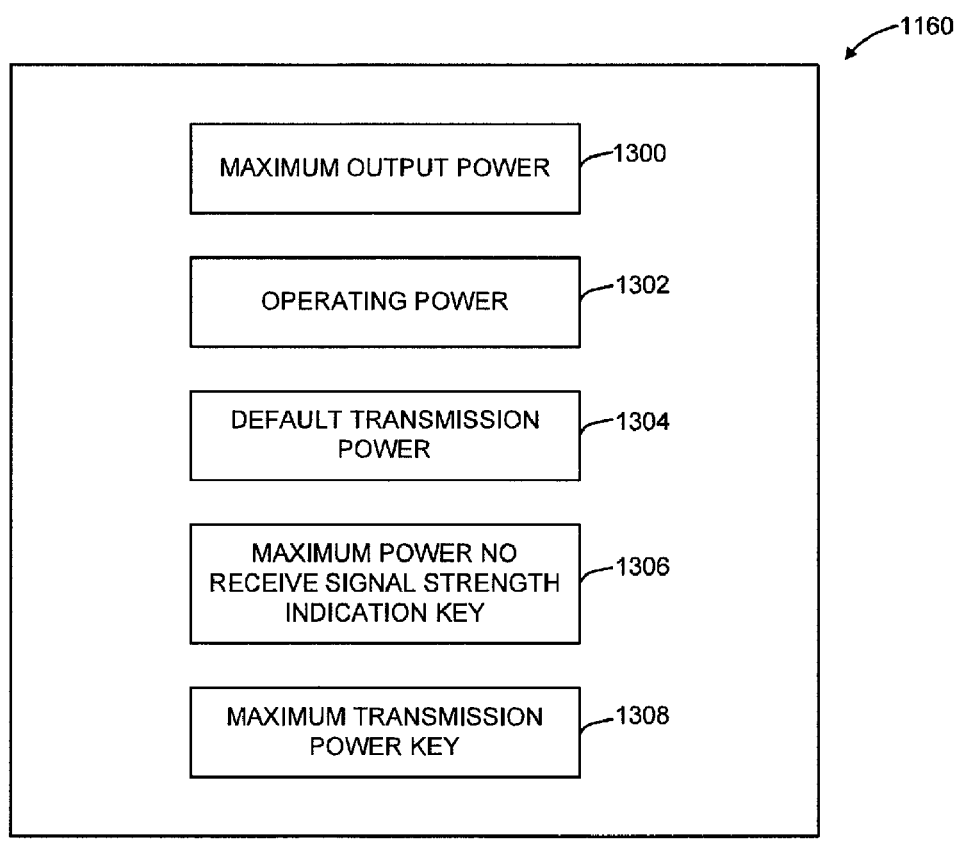
FIG. 3 is a block diagram illustrating exemplary parameters of a radio transceiver.

As shown in FIGS. 1-3, terminal 10 provided for herein has a radio transceiver 1160. Radio transceiver 1160 has a maximum output power 1300 and an operating power 1302. In one embodiment, terminal 10 can be configured so that operating power 1302 is limitable to a power limit (not shown) that is less than or equal to maximum output power 1300 and is operator selectable from a set of power limit values 602, so as to reduce interference with other devices operating in a shared environment and in the same spectrum, e.g., in the 2.4 GHz spectrum of the ISM band. Radio transceiver 1160 can be operative so that operating power 1302 is limited according to the power limit, regardless of whether terminal 10 is in a connected or unconnected state.

In one embodiment, set of power limit values 602 includes maximum output power 1300 and a plurality of additional values. In one embodiment, terminal 10 is configured to allow fine resolution selection of power limit 600. In many use environments, for example, equipment may be moved with slight changes of interference risk. In an environment, it was determined that configuring terminal 10 to allow fine resolution selection of power limit 600 would allow, e.g., a slight reduction of the limitation of operating power 1302 in response to a slight increase in the interference level in the environment. By allowing a slight reduction, the risk that terminal 10 will become susceptible to difficulty in communicating with other devices is significantly decreased. In one example, set of power limit values 602 includes a plurality of values, the plurality of values including at least first and second values less than 16 dB apart in magnitude, so as to reduce interference with other devices operating in said 2.4 GHz spectrum. In another example, the at least first and second values are less than 8 dB apart in magnitude. In another example, the at least first and second values are less than 4 dB apart in magnitude. In another example, the at least first and second values are less than 2 dB apart in magnitude.

Referring to FIGS. 1 and 2, terminal 10 can be a bar code reading terminal comprising a bar code reader unit 1214, a manual trigger 1150, a hand held housing 11, and a radio transceiver 1160. Terminal 10 is configured so that when manual trigger 1150 is actuated, bar code reader unit 1214 produces a decoded bar code data message. Bar code reader unit 1214 may be provided, e.g., by an IT4XXX/5XXX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, MaxiCode, Data Matrix, QR Code, Aztec, Aztec Mesa, Code 49, UCC Composite, Snowflake, Data Gliffs, Code 39, Code 128, Codabar, UPC, EAN, Interleaved 205, RSS, Code 93, Codablock, BC412, Postnet, Planet Code, Japanese Post, KIX (Dutch Post), OCR A and OCR B. Bar code reader unit 1214 can also be a laser scanning type bar code unit, e.g., such as may be provided by an MS-3 Laser Scanner OEM Module available from MICROSCAN.

Hand held housing 11 can encapsulate at least one component of terminal 10. Hand held housing 11 can be configured so that a user can actuate manual trigger 1150 when grasping hand held housing 11.

Radio transceiver 1160 can be encapsulated by hand held housing 11. Radio transceiver 1160 can be operative in the 2.4 GHz spectrum of the ISM band. Radio transceiver can further be operative to hop across a plurality of frequency channels in said 2.4 GHz spectrum when terminal 10 is in a connected state so as to reduce interference with devices other than terminal 10 operating in a shared environment and in the 2.4 GHz spectrum.

Figure 4:
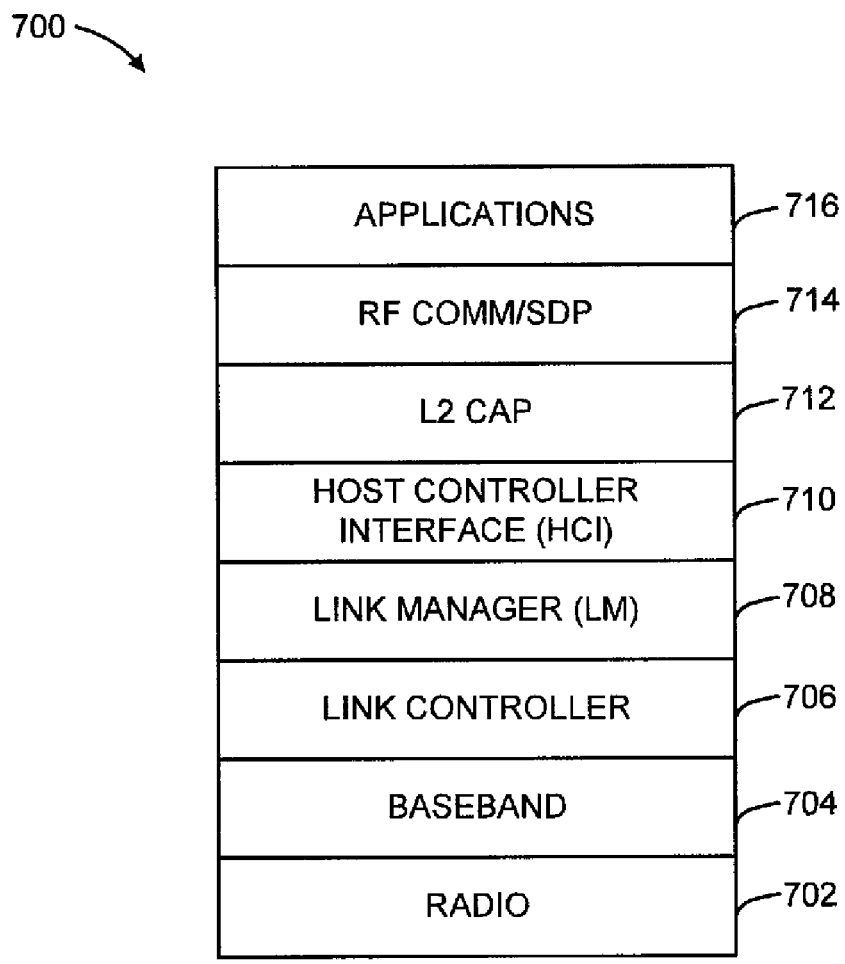
FIG. 4 is a layer diagram illustrating various software layers incorporated in a Bluetooth protocol stack.

Radio transceiver 1160 can be a Bluetooth radio transceiver wherein maximum output power 1300 is defined by a standard disclosed in, e.g., Bluetooth Specification v4.0. Terminal 10 can incorporate the Bluetooth protocol stack 700, which includes various layers that are depicted in FIG. 4. The Bluetooth protocol stack 700 includes a radio layer 702, a baseband layer 704, a link controller 706, a link manager (LM) 708, a host controller interface (HCI) 710, an L2CAP layer 712, an RFCOMM/SDP layer 714, and applications layer 716. RFCOMM/SDP layer 714 is the transport layer of Bluetooth with provision for RS-232 serial port emulation, which can be used to connect to legacy application and data transfer using several Bluetooth profiles. Such a Bluetooth stack 700 can also be incorporated in other devices located in a health care setting such as that shown in FIG. 1.

Radio transceiver 1160 can have a default transmission power key 1304, a maximum power no receive signal strength indication key 1306, and a maximum transmission power key 1308 as shown in FIG. 3. Default transmission power key 1304, maximum power no receive strength signal indication key 1306, and maximum transmission power key 1308 can be set according to the power limit. Radio transceiver 1160 can utilize default transmission power key 1304, maximum output power no receive strength signal indication key 1306, and maximum transmission power key 1308 for limiting operating power 1302 according to the power limit.

Terminal 10 can be restricted from being responsive to external power control requests to terminal 10, regardless of whether operating power 1302 is limited to less than or equal to maximum output power 1300 according to the power limit. Such restriction can be provided when terminal 10 is, e.g., a class 2 Bluetooth device that either does not incorporate Bluetooth power control functionality or maintains such functionality in an inactive state. For example, when terminal 10 is connected to an external device using the Bluetooth protocol, terminal 10 will process neither messages to increase power, e.g., LMP-incr_power_req messages, nor messages to decrease power, e.g., LMP_decr_power_req messages, from a link manager of the external device.

Restricting terminal 10 from being responsive to power control requests provides important advantages. One such advantage is that terminal 10 can be expected to be less susceptible to losing established connections with external devices. A second such advantage is that terminal 10 is alternatively operative to reduce interference in lieu of changing operating power 1302 in response to power control requests. A third such advantage is that terminal 10 is restricted from transmitting messages that are responsive to power control requests, e.g., LMP_max_power and LMP_min_power messages, which messages constitute added traffic that can be expected to contribute to interference.

Additional features and components which can be incorporated into terminal 10 are now described. Terminal 10 may include an image sensor assembly including an image sensor array 1164 and a lens 1165 for focusing an image of a substrate bearing a bar code onto image sensor array 1164. In the specific embodiments shown, image sensor array 1164 is provided by a CMOS image sensor array. However, image sensor 1164 array could be of another type such as a CCD image sensor array. Image sensor array 1164 can include a plurality of pixels formed in a plurality of rows and columns of pixels. In the specific embodiment shown, the image sensor array has a pixel array of 1280×1024 pixels. The image sensor array can be a color image sensor array having a Bayer pattern filter applied over the pixels of the image sensor array. In another embodiment, the image sensor array could be a linear image sensor array having an array of e.g., 1280×1 pixels or 1280×2 pixels. Referring to further aspects of image sensor array 1164, image sensor array 1164 can be formed on image sensor integrated circuit 1162 which includes among other elements row circuitry 1166, column circuitry 1168 including readout circuitry, timing and control circuitry 1176, gain circuitry 1170, A/D converter 1172, and line driver 1174.

Image sensor integrated circuit 1162 in one embodiment operates under the control of CPU 1140. In response to receipt of a trigger signal as may be initiated by depressing manual trigger 1150, CPU 1140 can send a frame capture initiation command over $I^2C$ bus 1145 to image sensor integrated circuit 1162. Timing and control circuit 1176 can interpret such a command and can send various exposure, readout, and reset signals and other timing and control signals to image sensor array 1164. Also in response to a trigger signal being initiated, illumination assembly 1160 can illuminate a substrate subject to bar code decoding. In response to receipt of the signals from pixels of image sensor array are read out, amplified by gain block 1170 digitized by A/D converter 1172, and sent to line driver 1174. Pixel values can be output from image sensor integrated circuit 1162 pixel by pixel and row by row until a frame of image data comprising rows and columns of pixels are output. Terminal 10 can include FPGA 1180 performing a DMA function to transfer image data output from image sensor integrated circuit IC 1162 to RAM 1250. When CPU 1140 has captured a frame of image data into RAM 1250, the CPU 1140 can further process the image data for decoding of bar codes. In the embodiment shown, terminal 10 includes a single CPU 140 for receiving inputs and outputs and for decoding of bar codes. Terminal 10 can include a separate decode CPU that is interfaced to CPU 1140. In addition or in place of having terminal 10 including the elements 1165, 1164, 1140, and 1250, terminal 10 can include an encoded information unit 1212 connected to system bus 1144 accessed by CPU 1140.

Encoded information reader unit 1212 can include one or more of bar code reader unit 1214, RFID reader unit 1216, and card reader unit 1218. Bar code reader unit 1214 may be provided, e.g., by an IT4XXX/5XXX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, Maxi-Code, Data Matrix, QR Code, Aztec, Aztec Mesa, Code 49, UCC Composite, Snowflake, Data Gliffs, Code 39, Code 128, Codabar, UPC, EAN, Interleaved 205, RSS, Code 93, Codablock, BC412, Postnet, Planet Code, Japanese Post, KIX (Dutch Post), OCR A and OCR B. Encoded information reader unit 1212 can also include an RFID reader unit 1216 such as that may be provided by an Skytek Sky Module M1 reading terminal and card reader unit 1218 which may include an integrated circuit card (IC CARD) reading terminal device otherwise known as a smart card reader. Because encoded information reader unit 1212 of terminal 10 can decode encoded data other than bar code message data, terminal 10 can, in addition to sending decoded bar code message data, send other decoded message data such as decode RFID message data, decoded mag stripe message data or decoded smart card message data Terminal 10 is referred to herein as a bar code reading terminal. However, it will be understood that in any of the embodiments described a bar code reader unit can be removed from terminal 10 and terminal 10 can be simply be a terminal without being a bar code reading terminal. Where terminal 10 incorporates bar code reader unit 1214, it can be referred to as a bar code reading terminal or simply a terminal. Terminal 10 can be configured so that terminal 10 decodes an encoded dataform in response to a user initiated command. Such a user initiated command may be initiated in response, e.g., to manual trigger 1150 being actuated, or in the case of a card reader, a card being moved through a slot disposed on hand held housing 11. Where terminal 10 incorporates card reader unit 1218, it may be referred to as a card reading terminal or simply a terminal. Where terminal 10 incorporates RFID reader unit 1216, it may be referred to an RFID reading terminal or simply a terminal.

Referring to further aspects of terminal 10, terminal 10 can include a program memory 1152 such as EPROM and a storage memory 1154 such as a hard drive. Terminal 10 can also include an I/O interface 1162 such an Ethernet or universal serial bus (USB) interface. Various components of terminal 10 can be in communication via system bus 1144. Terminal 10 can also include an optional user interface block 1119 including such elements as a keyboard 1124, display 1120 having touch screen overlay 1121, and pointer controller 1122. In some embodiments however, terminal 10 can be provided in a form without a display 1120.

Figure 5:
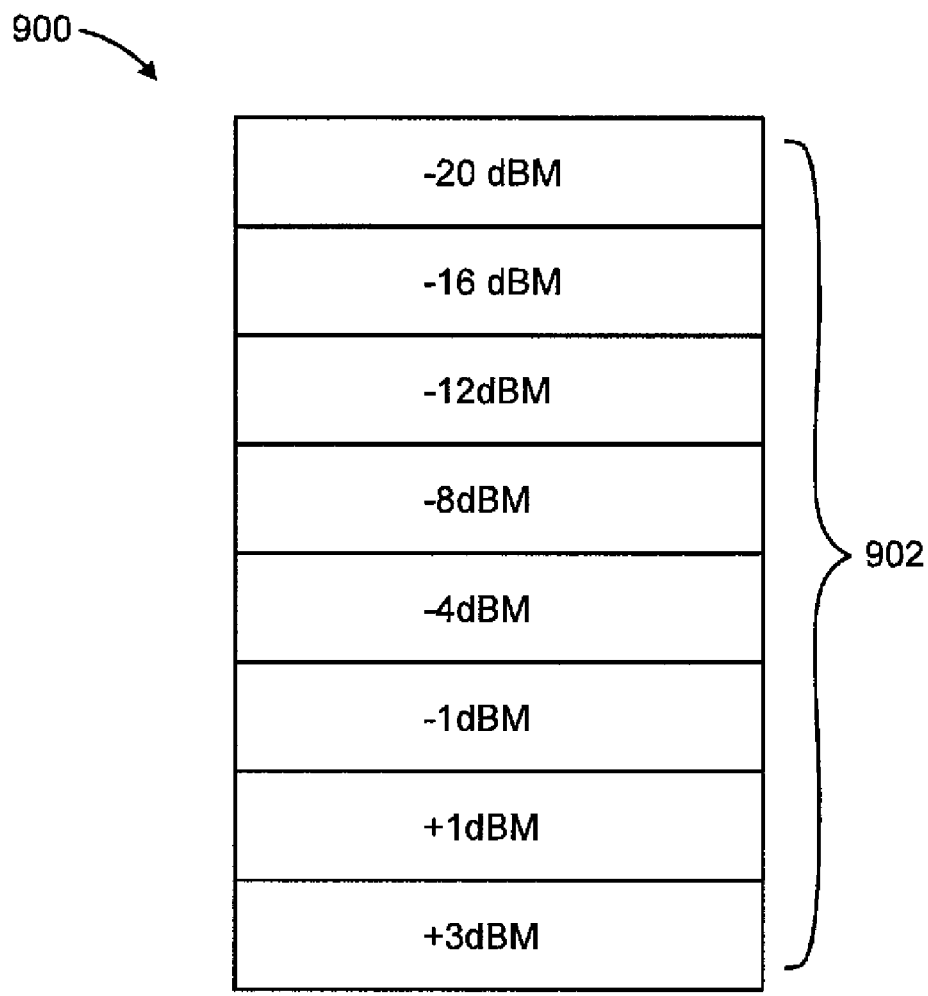
FIG. 5 is a table illustrating an exemplary plurality of power levels of a power table.

In one embodiment, a power table 900 can be stored in RAM 1250 or program memory 1152. Power table 900 can include a plurality of power levels 902. Maximum output power 1300 can be a highest power level of plurality of power levels 902. Operating power 1302 can be configurable to any of plurality of power levels 902 that are less than or equal to maximum output power 1300. Terminal 10 can utilize power table 900 for restricting operating power 1302 from being configurable to any of plurality of power levels 902 that is in excess of the power limit. In an example of the above embodiment, as shown in FIG. 5, if plurality of power levels 902 is −20 dBm, −16 dBm, −12 dBm, −8 dBm, −4 dBm, −1 dBm, +1 dBm, and +3 dBm, maximum output power 1300 can be highest power level +3 dBm of plurality of power levels 902. Operating power 1302 can be configurable to any of −20 dBm, −16 dBm, −12 dBm, −8 dBm, −4 dBm, −1 dBm, +1 dBm, and +3 dBm. If the power limit is −8 dBm, operating power 1302 can be configurable to any of −20 dBm, −16 dBm, −12 dBm, −8 dBm, but can be restricted to being configurable to any of −4 dBm, −1 dBm, +1 dBm, and +3 dBm.

Figure 6:
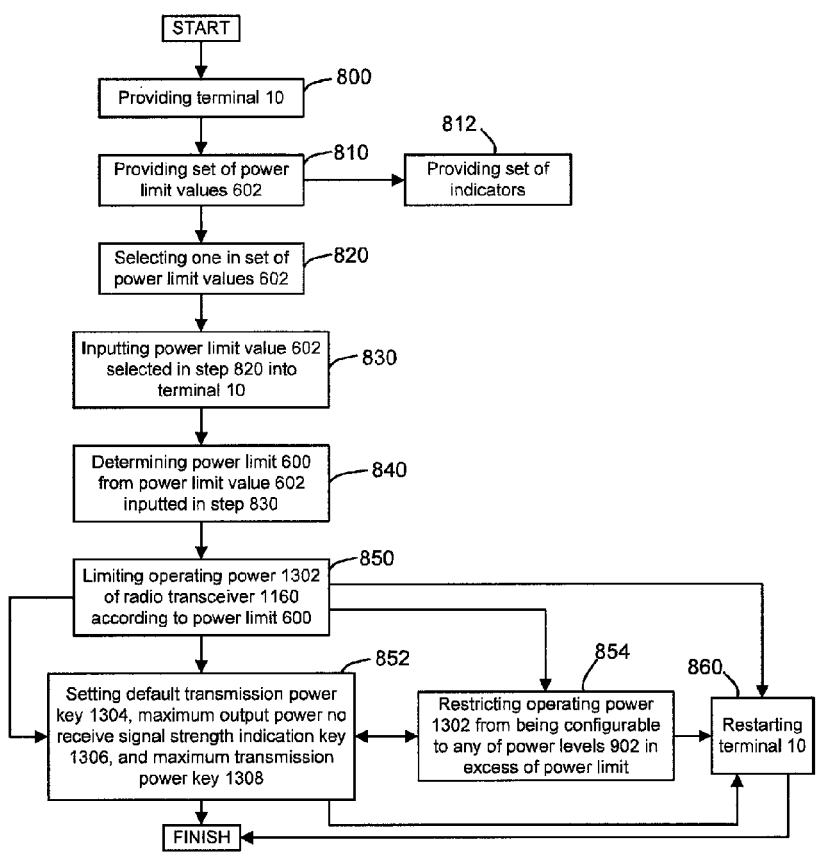
FIG. 6 is a flow diagram illustrating steps of a process that can be carried out by a user for limiting an operating power of a radio transceiver of a terminal a power limit that is less than or equal to the maximum output power of the radio transceiver and is operator selectable from a set of power limit values.

In another embodiment, as shown in FIG. 6, there is provided a method for reducing interference contributed by terminal 10. The method comprises the steps of 800 providing terminal 10 in an exemplary embodiment as shown in FIGS. 1-5 and described elsewhere in this disclosure, 810 providing a set of power limit values 602 including maximum output power 1300 and a plurality of additional values, 820 selecting one in set of power limit values 602, 830 inputting the one in set of power limit values 602 that was selected in step 820 into terminal 10, 840 determining the power limit from the one in said set of power limit values 602 that was inputted in step 830, and 850 limiting operating power 1302 of radio transceiver 1160 according to the power limit. Inputting step 830 can comprise inputting the one of power limit values of selected in selecting step 820 into terminal 10 using serial port emulation.

Set of power limit values 602 can be provided in a tangible medium, e.g., in a manual corresponding to terminal 10, or can be provided in an electronic format, e.g., in a PDF file on a user interface 2264 of a display 2220 of a host system 100 connected to base 200. Host system 100 can be connected to base 200 through a USB connection, a serial connection, or any other suitable type of connection. User interface 2264 can be a graphical user interface (GUI), a web-based user interface (WUI), or any other interface suitable for providing set of power limit values 602. Referring to FIGS. 1 and 2, host system 100 can further include CPU 2240, a keyboard 2224, a radio transceiver 2260, an I/O interface 2262, a working memory or RAM 2250, a program memory 2252 such as may be provided by EPROM, and storage memory 2254, e.g., a hard drive. The components can be in communication via system bus 2244. The host system 100 can incorporate a real time operating system such as WINDOWS 7 supporting advance applications and user interface functionality, can incorporate the TCP/IP protocol stack, can incorporate the Bluetooth protocol stack 700 including various layers that are depicted in FIG. 4, and can access the Internet.

Figures 7A, 7B, 7C:
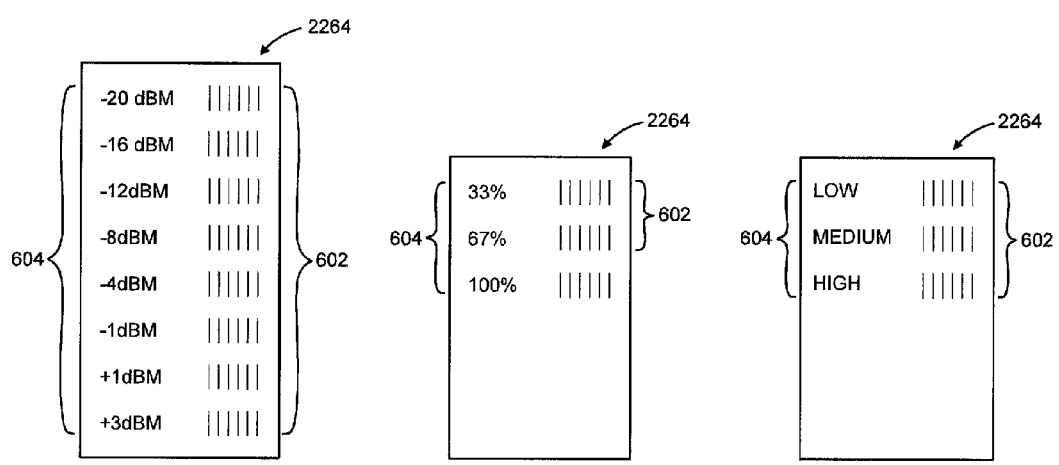
FIG. 7a illustrates a user interface of a display of a host system providing a set of power limit values as a set of encoded bar code symbols and providing a set of power limit indicators, each in the set of indicators corresponding to one in the set of the encoded bar code symbols and being in a format of a numeric measurement.
FIG. 7b illustrates a user interface of a display of a host system providing a set of power limit values as a set of encoded bar code symbols and providing a set of power limit indicators, each in the set of indicators corresponding to one in the set of the encoded bar code symbols and being in a format of a maximum output power of a radio transceiver of a terminal.
FIG. 7c illustrates a user interface of a display of a host system providing a set of power limit values as a set of encoded bar code symbols and providing a set of power limit indicators, each in the set of indicators corresponding to one in the set of the encoded bar code symbols and being in a format of a power indicator.

Referring to FIGS. 7a-7c, set of values 602 can be provided as a set of encoded bar code symbols. Providing step 810 can include the step of providing a set of indicators 604, wherein each of indicators 604 can correspond to one of the encoded bar code symbols and can be in a format selected from the group consisting of a numeric measurement, a percentage of maximum output power 1300, and a power ranking. In FIG. 7a, set of indicators 604 are numeric measurements −20 dBm, −16 dBm, −12 dBm, −8 dBm, −4 dBm, −1 dBm, +1 dBm, and +3 dBm. As shown in FIG. 7b, set of indicators 604 are percentages thirty-three percent (33%), sixty-seven percent (67%), and one hundred percent (100%) of maximum output power 1300. As shown in FIG. 7c, set of indicators 604 are power rankings "LOW", "MEDIUM", and "HIGH".

Selecting step 820 can comprise the step of selecting one of the encoded bar code symbols. Inputting step 830 can comprise the step of scanning with terminal 10 the encoded bar code symbol selected in selecting step 820. The encoded bar code symbol selected in selecting step 820 can be a programming bar code symbol. The programming bar code symbol can be an encoded percentage of maximum output power 1300. Determining step 840 can comprise the steps of decoding the programming bar code symbol into the power limit, converting the power limit so that the power limit is of a same data type as each in plurality of power levels 902 of power table 900 (if the power limit is not of said data type), and equating the power limit to one of plurality of power levels 902 (if the power limit is not among plurality of power levels 902). Limiting step 850 can further include the step 854 of restricting operating power 1302 from being configurable to any of plurality of power levels 902 that is in excess of the power limit. Maximum output power 1300 can be a highest power level of plurality of power levels 902.

Referring to FIGS. 5 and 7c as an example, the encoded bar code symbol corresponding to "LOW" indicator 604 is selected in selecting step 820. The encoded bar code symbol is scanned with terminal 10 in inputting step 830. The encoded bar code symbol is a programming bar code symbol that is an encoded percentage of maximum output power 1300. In determining step 840: the programming bar code symbol is decoded into the power limit of, e.g., "33"; the power limit of "33" is converted into the power limit of, e.g., −5 dBm (−5 hypothetically being 33% of maximum output power 1300 and dBm being the data type of each of plurality of power levels 602); and, because the power limit of −5 dBm is not among plurality of power levels 902 in power table 900, the power limit is equated to, e.g., −4 dBm, −4 dBm being the next highest in plurality of power levels 902 to −5 dBm. In limiting step 850, operating power 1302 of radio transceiver 1160 is limited to the power limit of −4 dBm. Restricting step 854 can be performed to restrict operating power 1302 from being configured to power levels 902 of −1 dBm, +1 dBm, and +3 dBm.

In another embodiment, as shown in FIG. 3, radio transceiver 1160 may optionally have a default transmission power key 1304, a maximum power no receive signal strength indication key 1306, and a maximum transmission power key 1308. In this embodiment, limiting step 850 can further include the step 852 of setting default transmission power key 1304, maximum power no receive signal strength indication key 1306, and maximum transmission power key 1308 according to the power limit. The step 860 of restarting terminal 10 after performing limiting step 850 can be performed so that radio transceiver 1160 can utilize default transmission power key 1304, maximum output power no receive strength signal indication key 1306, and maximum transmission power key 1308 for limiting operating power 1302 according to the power limit.

A small sample of systems methods and apparatus that are described herein is as follows:

A1. A bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a radio transceiver encapsulated by said hand held housing and having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum; and
wherein said operating power of said radio transceiver is limitable to a power limit that is less than or equal to said maximum output power of said radio transceiver and is operator selectable from a set of power limit values including said maximum output power and a plurality of additional values, so as to reduce interference with other devices operating in said 2.4 GHz spectrum.

A2. The bar code reading terminal of claim A1, wherein said radio transceiver is operative so that said operating power is limited according to said power limit.

A3. The bar code reading terminal of claim A1, further comprising a memory storing a power table, said power table indicating a plurality of power levels, and wherein said bar code reading terminal utilizes said power table for configuring said operating power to any of said plurality of power levels that are less than or equal to said maximum output power.

A4. The bar code reading terminal of claim A3, wherein said bar code reading terminal utilizes said power table for restricting said operating power from being configurable to any of said plurality of power levels that is in excess of said power limit.

A5. The bar code reading terminal of claim A3, wherein said maximum output power is a highest power level of said plurality of power levels.

A6. The bar code reading terminal of claim A1, wherein said bar code reading terminal further comprises a serial port emulation and is configured to transmit said decoded bar code data message to an external host utilizing said serial port emulation.

A7. The bar code reading terminal of claim A1, wherein said radio transceiver further comprises a default transmission power key, a maximum output power no receive strength signal indication key, and a maximum transmission power key.

A8. The bar code reading terminal of claim A7, wherein said default transmission power key, said maximum output power no receive strength signal indication key, and said maximum transmission power key are set according to said power limit.

A9. The bar code reading terminal of claim A8, wherein said radio transceiver utilizes said default transmission power key, said maximum output power no receive strength signal indication key, and said maximum transmission power key for limiting said operating power according to said power limit.

A10. The bar code reading terminal of claim A1, wherein said maximum output power is defined by a standard.

A11. The bar code reading terminal of claim A10, wherein said standard is disclosed in a Bluetooth specification.

B1. A bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a radio transceiver encapsulated by said hand held housing and having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum; and
wherein said operating power of said radio transceiver is limitable to a power limit that is less than or equal to said maximum output power of said radio transceiver and is operator selectable from a set of power limit values including a plurality of values, the plurality of values including at least first and second values less than 16 dB apart in magnitude, so as to reduce interference with other devices operating in said 2.4 GHz spectrum.

B2. The bar code reading terminal of claim B1, wherein said at least first and second values are less than 8 dB apart in magnitude.

B3. The bar code reading terminal of claim B1, wherein said at least first and second values are less than 4 dB apart in magnitude.

B4. The bar code reading terminal of claim B1, wherein said at least first and second values are less than 2 dB apart in magnitude.

C1. A method for reducing interference contributed by a bar code reading terminal, said method comprising the steps of:
(a) providing said bar code reading terminal, said bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a serial port emulation, wherein said bar code reading terminal is configured to transmit said decoded bar code data message to an external host utilizing said serial port emulation;
a radio transceiver encapsulated by said hand held housing having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum;
wherein said operating power of said radio transceiver is limitable to a power limit that is less than or equal to said maximum output power of said radio transceiver and is operator selectable;
(b) providing a set of power limit values;
(c) selecting one in said set of power limit values;
(d) inputting said one of said power limit values of selecting step (c) into said bar code reading terminal;
(e) determining said power limit from said one of said power limit values of inputting step (d); and
(f) limiting said operating power of said radio transceiver according to said power limit.

C2. The method of claim C1, wherein said set of power limit values is provided in an electronic format.

C3. The method of claim C1, wherein said set of power limit values is provided a as a set of encoded bar code symbols.

C4. The method of claim C3, wherein said selecting step (c) comprises the step of selecting one in said set of encoded bar code symbols, and wherein said inputting step (d) comprises the step of scanning with said bar code reading terminal said one in said set of encoded bar code symbols selected in selecting step (c).

C5. The method of claim C4, wherein said one in said set of encoded bar code symbols selected in said selecting step (c) is a programming bar code symbol, and wherein said determining step (e) comprises the steps of decoding said programming bar code symbol into said power limit, converting said power limit so that said power limit is of a same data type as each of a plurality of power levels of a power table stored in a memory of said bar code reading terminal if said power limit is not of said data type, and equating said power limit to one of said plurality of power levels if said power limit is not among said plurality of power levels.

C6. The method of claim C5, wherein said programming bar code symbol is an encoded percentage of said maximum output power.

C7. The method of claim C3, wherein said providing step (b) further includes the step of providing a set of indicators, each in said set of indicators corresponding to one in said set of said of encoded bar code symbols.

C8. The method of claim C7, wherein each in said set of indicators is in a format selected from the group consisting of a numeric measurement, a percentage of said maximum output power, and a power ranking.

C9. The method of claim C1, wherein said bar code reading terminal further comprises a memory storing a power table, said power table having a plurality of power levels, wherein said bar code reading terminal utilizes said power table for configuring said operating power to any of said plurality of power levels that are less than or equal to said maximum output power, and wherein said limiting step (f) further includes the step of restricting said operating power from being configurable to any of said plurality of power levels that is in excess of said power limit.

C10. The method of claim C9, wherein said maximum output power is a highest power level of said plurality of power levels.

C11. The method of claim C1, wherein said limiting step (f) further includes the step of setting a default transmission power key of said radio transceiver, a maximum output power no receive signal strength indication key of said radio transceiver, and a maximum transmission power key of said radio transceiver according to said power limit.

C12. The method of claim C11, further comprising the step of restarting said bar code reading terminal after performing said limiting step (f) so that said radio transceiver utilizes said default transmission power key, said maximum output power no receive strength signal indication key, and said maximum transmission power key for limiting said operating power according to said power limit.

C13. The method of claim C1, wherein said set of power limit values is provided in a tangible medium.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

We claim:

1. A bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a radio transceiver encapsulated by said hand held housing and having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum; and wherein said operating power of said radio transceiver is limitable to a power limit that is less than or equal to said maximum output power of said radio transceiver and is operator selectable from a set of power limit values including said maximum output power and a plurality of additional values, so as to reduce interference with other devices operating in said 2.4 GHz spectrum.

2. The bar code reading terminal of claim 1, wherein said radio transceiver is operative so that said operating power is limited according to said power limit.

3. The bar code reading terminal of claim 1, further comprising a memory storing a power table, said power table indicating a plurality of power levels, and wherein said bar code reading terminal utilizes said power table for configuring said operating power to any of said plurality of power levels that are less than or equal to said maximum output power.

4. The bar code reading terminal of claim 3, wherein said bar code reading terminal utilizes said power table for restricting said operating power from being configurable to any of said plurality of power levels that is in excess of said power limit.

5. The bar code reading terminal of claim 3, wherein said maximum output power is a highest power level of said plurality of power levels.

6. The bar code reading terminal of claim 1, wherein said bar code reading terminal further comprises a serial port emulation and is configured to transmit said decoded bar code data message to an external host utilizing said serial port emulation.

7. The bar code reading terminal of claim 1, wherein said radio transceiver further comprises a default transmission power key, a maximum output power no receive strength signal indication key, and a maximum transmission power key.

8. The bar code reading terminal of claim 7, wherein said default transmission power key, said maximum output power no receive strength signal indication key, and said maximum transmission power key are set according to said power limit.

9. The bar code reading terminal of claim 8, wherein said radio transceiver utilizes said default transmission power key, said maximum output power no receive strength signal indication key, and said maximum transmission power key for limiting said operating power according to said power limit.

10. A bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a radio transceiver encapsulated by said hand held housing and having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum; and wherein said operating power of said radio transceiver is limitable to a power limit that is less than or equal to said maximum output power of said radio transceiver and is operator selectable from a set of power limit values including a plurality of values, the plurality of values including at least first and second values less than 16 dB apart in magnitude, so as to reduce interference with other devices operating in said 2.4 GHz spectrum.

11. The bar code reading terminal of claim 10, wherein said at least first and second values are less than 8 dB apart in magnitude.

12. The bar code reading terminal of claim 10, wherein said at least first and second values are less than 4 dB apart in magnitude.

13. The bar code reading terminal of claim 10, wherein said at least first and second values are less than 2 dB apart in magnitude.

14. A method for reducing interference contributed by a bar code reading terminal, said method comprising the steps of:
(a) providing said bar code reading terminal, said bar code reading terminal comprising:
a bar code reader unit;
a manual trigger;
a hand held housing encapsulating at least one component of said bar code reading terminal, said housing being configured so that a user can actuate said manual trigger when grasping said housing, said bar code reading terminal being configured so that when said manual trigger is actuated said bar code reader unit produces a decoded bar code data message;
a serial port emulation, wherein said bar code reading terminal is configured to transmit said decoded bar code data message to an external host utilizing said serial port emulation;
a radio transceiver encapsulated by said hand held housing having a maximum output power and an operating power;
wherein said radio transceiver is operative in a 2.4 GHz spectrum of an Industrial, Scientific, and Medical (ISM) band;
wherein said radio transceiver is further operative to hop across a plurality of frequency channels in said 2.4 GHz spectrum when said bar code reading terminal is in a connected state so as to reduce interference with other devices operating in said 2.4 GHz spectrum;
wherein said operating power of said radio transceiver is limitable to a power limit that is less than or equal to said maximum output power of said radio transceiver and is operator selectable;
(b) providing a set of power limit values;
(c) selecting one in said set of power limit values;
(d) inputting said one of said power limit values of selecting step (c) into said bar code reading terminal;
(e) determining said power limit from said one of said power limit values of inputting step (d); and
(f) limiting said operating power of said radio transceiver according to said power limit.

15. The method of claim 14, wherein said set of power limit values is provided in an electronic format.

16. The method of claim 14, wherein said set of power limit values is provided as a set of encoded bar code symbols.

17. The method of claim 16, wherein said selecting step (c) comprises the step of selecting one in said set of encoded bar code symbols, and wherein said inputting step (d) comprises the step of scanning with said bar code reading terminal said one in said set of encoded bar code symbols selected in selecting step (c).

18. The method of claim 17, wherein said one in said set of encoded bar code symbols selected in said selecting step (c) is a programming bar code symbol, and wherein said determining step (e) comprises the steps of decoding said programming bar code symbol into said power limit, converting said power limit so that said power limit is of a same data type as each of a plurality of power levels of a power table stored in a memory of said bar code reading terminal if said power limit is not of said data type, and equating said power limit to one of said plurality of power levels if said power limit is not among said plurality of power levels.

19. The method of claim 18, wherein said programming bar code symbol is an encoded percentage of said maximum output power.

20. The method of claim 16, wherein said providing step (b) further includes the step of providing a set of indicators, each in said set of indicators corresponding to one in said set of said of encoded bar code symbols.

21. The method of claim 20, wherein each in said set of indicators is in a format selected from the group consisting of a numeric measurement, a percentage of said maximum output power, and a power ranking.

22. The method of claim 14, wherein said bar code reading terminal further comprises a memory storing a power table, said power table having a plurality of power levels, wherein said bar code reading terminal utilizes said power table for configuring said operating power to any of said plurality of power levels that are less than or equal to said maximum output power, and wherein said limiting step (f) further includes the step of restricting said operating power from being configurable to any of said plurality of power levels that is in excess of said power limit.

23. The method of claim 22, wherein said maximum output power is a highest power level of said plurality of power levels.

24. The method of claim 14, wherein said limiting step (f) further includes the step of setting a default transmission power key of said radio transceiver, a maximum output power no receive signal strength indication key of said radio transceiver, and a maximum transmission power key of said radio transceiver according to said power limit.

25. The method of claim 24, further comprising the step of restarting said bar code reading terminal after performing said limiting step (f) so that said radio transceiver utilizes said default transmission power key, said maximum output power no receive strength signal indication key, and said maximum transmission power key for limiting said operating power according to said power limit.

* * * * *